United States Patent [19]

Chow et al.

[11] Patent Number: 5,546,524
[45] Date of Patent: Aug. 13, 1996

[54] METHOD AND APPARATUS FOR INTERLOCKING GRAPHICAL OBJECTS

[75] Inventors: Alex C. Chow; John S.-Y. Wang, both of Austin, Tex.

[73] Assignee: International Business Machines Corp., Armonk, N.Y.

[21] Appl. No.: 167,754

[22] Filed: Dec. 15, 1993

[51] Int. Cl.$^6$ ............................................. G06F 3/14
[52] U.S. Cl. ....................... 395/157; 395/155; 395/158
[58] Field of Search ............................. 395/139, 155, 395/156, 157, 158, 159, 160, 161, 500, 700, 800

[56] References Cited

U.S. PATENT DOCUMENTS

| | | |
|---|---|---|
| 4,698,779 | 10/1987 | Holden et al. |
| 4,769,636 | 9/1988 | Iwami et al. |
| 4,779,081 | 10/1988 | Nakayama et al. |
| 4,888,583 | 12/1989 | Ligocki et al. |
| 5,072,412 | 12/1991 | Henderson, Jr. et al. |
| 5,355,447 | 10/1994 | Knowlton ........................ 395/139 |
| 5,371,845 | 12/1994 | Newell et al. ................... 395/155 |
| 5,377,317 | 12/1994 | Bates et al. ..................... 395/157 |
| 5,442,795 | 8/1995 | Levine et al. .................... 395/800 |

OTHER PUBLICATIONS

On Translating A Set of Objects in 2–and 3–Dimensional Space, (2435) Computer Vision, Graphics, and Image Processing (1986 Oct., No.1, Duluth, MN, USA Otto Nurmi, ISSN 0734–189X, pp. 42–52.

Snap–Dragging, EXRV Computer Graphics vol. 20, Nov. 4, 1986 Eric Allan Bier, Dallas, Aug. 18–22 USA, pp. 233–240, ISSN 0097–8930.

*Primary Examiner*—Mark R. Powell
*Assistant Examiner*—Ruay L. Ho
*Attorney, Agent, or Firm*—Paul S. Drake; Volel Emile

[57] ABSTRACT

An apparatus for moving graphical objects including a display for displaying multiple graphical objects according to a display priority, apparatus for moving, responsive to a user input, a displayed graphical object, and apparatus for modifying, responsive to a user input, a display priority of the moved graphical object as the graphical object is moved so that the moved graphical object is displayed under a portion of a second displayed graphical object. In addition, a method for moving graphical objects including displaying multiple graphical objects according to a display priority on a display, moving, responsive to a user input, a displayed graphical object, and modifying, responsive to a user input, a display priority of the moved graphical object as the graphical object is moved so that the moved graphical object is displayed under a portion of a second displayed graphical object.

16 Claims, 11 Drawing Sheets

METHOD AND APPARATUS FOR INTERLOCKING GRAPHICAL OBJECTS

TECHNICAL FIELD

The present invention relates generally to computer graphics systems and more particularly to a method and apparatus for interlocking graphical objects.

BACKGROUND ART

In computer graphics systems, it is desired to represent two and three dimensional graphical pictures on a two dimensional display. Typically, such a picture is a construct or image that may be stored in memory as a set of polygons. To generate the picture on the display, the polygons are then rendered using processes that are typically computationally intensive. However, a portion of the picture to be represented may fall outside the field of vision provided by a window on the display or by the display itself. In such cases, it may be desirable to clip the picture and the polygons comprising the picture as the picture is being generated, thereby reducing computational requirements and increasing rendering speed.

A polygon is typically specified as a set of vertices $P(0)$, $P(1), \ldots, P(n-2), P(n-1)$, where n is the number of vertices in the polygon. Each vertex $P(i)$ is specified by its location $V(i)$ in a suitable coordinate space and a function, referred to herein as a color factor, $f(V(i))$. A color factor is a function evaluated at each vertex that may be displayed later as a color (including a grayscale) variation (such as a light intensity, a thermal characteristic, a humidity factor, etc.). The color factor may be converted to a color and is useful in modelling (such as simple lighting modelling or more complex weather modelling).

Once the polygons are rendered, typical two dimensional graphics systems allow the user to pick and drag polygons to desired locations. A polygon is picked when the user selects that object, typically by positioning a cursor over the object and pressing a mouse button. The object is dragged by the user moving the cursor, typically by moving the mouse while continuing to press the mouse button. Typically, an object being dragged is shown in outline form during the dragging operation to reduce computational requirements of rendering the object as the object is moved. Once the user has completed dragging the object, the user may then drop the object, typically by releasing the mouse button. Prior art systems then render the polygon in the drop location. If there are any pre-existing objects that are also at the same location, then the dropped object is rendered as being on top of the pre-existing object. If the user desires the pre-existing object to be on top of the dropped object, then the user must pick the pre-existing object and then drop it without dragging the object anywhere. This results in the pre-existing object being placed on top of the just dragged object.

DISCLOSURE OF THE INVENTION

The present invention includes an apparatus for moving graphical objects including a display for displaying multiple graphical objects according to a display priority, apparatus for moving, responsive to a user input, a displayed graphical object, and apparatus for modifying, responsive to a user input, a display priority of the moved graphical object as the graphical object is moved so that the moved graphical object is displayed under a portion of a second displayed graphical object. In addition, the present invention includes a method for moving graphical objects including displaying multiple graphical objects according to a display priority on a display, moving, responsive to a user input, a displayed graphical object, and modifying, responsive to a user input, a display priority of the moved graphical object as the graphical object is moved so that the moved graphical object is displayed under a portion of a second displayed graphical object.

A further understanding of the nature and advantages of the present invention may be realized by reference to the remaining portions of the specification and the drawings.

BEST MODE FOR CARRYING OUT THE INVENTION

This disclosure describes an improved method and apparatus for interlocking objects, particularly in two dimensional environments. In the preferred embodiment, the user may drag a graphical object above, below, or both above and below (interlocking) another graphical object.

Figure 1:
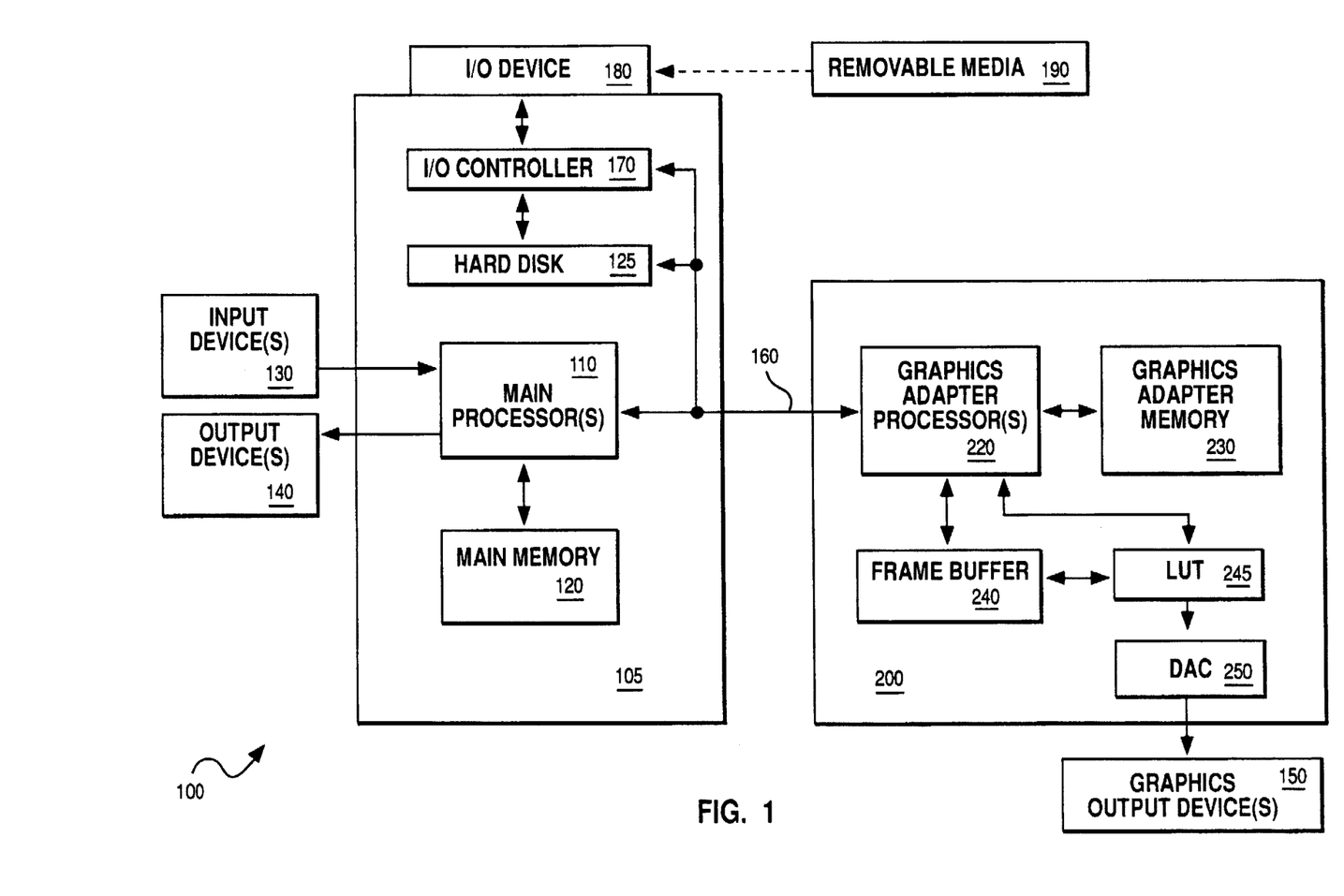
FIG. 1 is a diagram of a typical digital computer utilized by a preferred embodiment of the invention.

FIG. 1 is a block diagram of a typical digital computer 100 utilized by a preferred embodiment of the invention. The computer includes main processor(s) 110 coupled to a memory 120 and a hard disk 125 in computer box 105 with input device(s) 130 and output device(s) 140 attached. Main processor(s) 110 may include a single processor or multiple processors. Input device(s) 130 may include a keyboard, mouse, tablet or other types of input devices. Output device(s) 140 may include a text monitor, plotter or other types of output devices. Computer readable removable media 190, such as a magnetic diskette or a compact disc, may be inserted into an input/output device 180, such as a disk drive or a CD-ROM (compact disc - read only memory) drive. Data is read from or written to the removable media by the I/O device under the control of the I/O device controller 170. The I/O device controller communicates with the main processor through across bus 160. Main memory 120, hard disk 125 and removable media 190 are all referred to as memory for storing data for processing by main processor(s) 110.

The main processor may also be coupled to graphics output device(s) 150 such as a graphics display through a graphics adapter 200. Graphics adapter 200 receives instructions regarding graphics from main processor(s) 110 on bus 160. The graphics adapter then executes those instructions with graphics adapter processor(s) 220 coupled to a graphics adapter memory 230. The graphics processors in the graphics adapter then execute those instructions and updates frame buffer(s) 240 based on those instructions. Graphic processors 220 may also include specialized rendering hardware for rendering specific types of primitives. Frame buffer(s) 240 includes data for every pixel to be displayed on the graphics output device. A RAMDAC (random access memory digital-to-analog converter) 250 converts the digital data stored in the frame buffers into RGB signals to be provided to the graphics display 150 thereby rendering the desired graphics output from the main processor.

Figure 2:
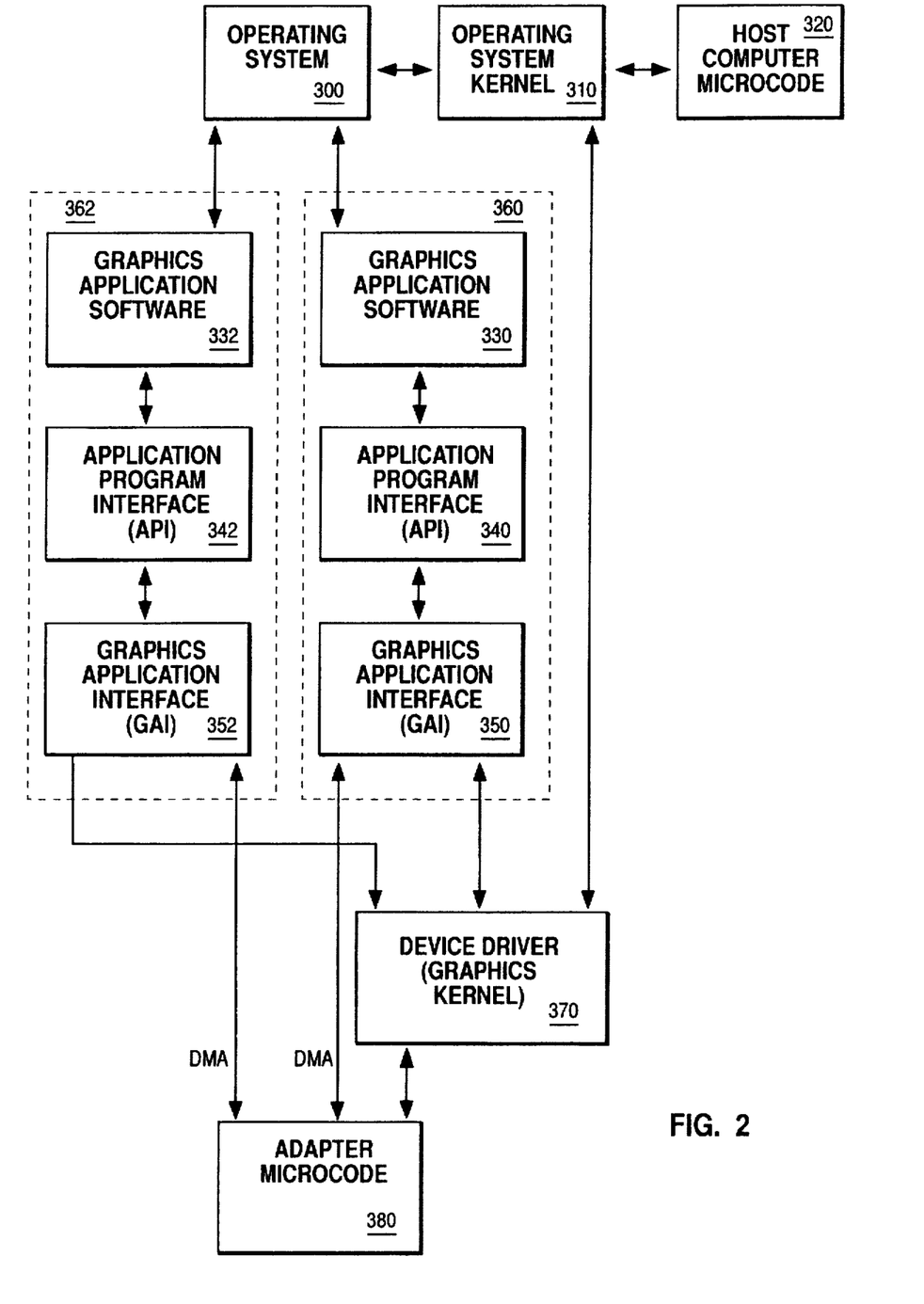
FIG. 2 is a block diagram illustrating the layers of code typically utilized by the host computer and graphics adapter to perform graphics functions.

FIG. 2 is a block diagram illustrating the layers of code typically utilized by the host computer and graphics adapter to perform graphics functions. An operating system 300 such as UNIX provides the primary control of the host computer. Coupled to the operating system is an operating system kernel 310 which provides the hardware intensive tasks for the operating system. The operating system kernel communicates directly with the host computer microcode 320. The host computer microcode is the primary instruction set executed by the host computer processor. Coupled to the operating system 300 are graphics applications 330 and 332. This graphics application software can include software packages such as Silicon Graphic's GL, IBM's graPHIGS, MIT's PEX, etc. This software provides the primary functions of two dimensional or three dimensional graphics. Graphics applications 330 and 332 are coupled to graphics application API (application program interface) 340 and 342, respectively. The API provides many of the computationally intensive tasks for the graphics application and provides an interface between the application software and software closer to the graphics hardware such as a device driver for the graphics adapter. For example, API 340 and 342 may communicate with a GAI (graphics application interface) 350 and 352, respectively. The GAI provides an interface between the application API and a graphics adapter device driver 370. In some graphics systems, the API also performs the function of the GAI.

The graphics application, API, and GAI are considered by the operating system and the device driver to be a single process. That is, graphics applications 330 and 332, API 340 and 342, and GAI 350 and 352 are considered by operating system 300 and device driver 370 to be processes 360 and 362, respectively. The processes are identified by the operating system and the device driver by a process identifier (PID) that is assigned to the process by the operating system kernel. Processes 360 and 362 may use the same code that is being executed twice simultaneously, such as two executions of a program in two separate windows. The PID is used to distinguish the separate executions of the same code.

The device driver is a graphics kernel which is an extension of the operating system kernel 310. The graphics kernel communicates directly with microcode of the graphics adapter 380. In many graphics systems, the GAI, or the API if no GAI layer is used, may request direct access from the GAI or API to the adapter microcode by sending an initial request instruction to the device driver. In addition, many graphics systems also allow the adapter microcode to request direct access from the adapter microcode to the GAI or API if no GAI is used by sending an initial request instruction to the device driver. Both processes will hereinafter be referred to as direct memory access (DMA). DMA is typically used when transferring large blocks of data. DMA provides for a quicker transmission of data between the host computer and the adapter by eliminating the need to go through the display driver other than the initial request for the device driver to set up the DMA. In some cases, the adapter microcode utilizes context switching which allows the adapter microcode to replace the current attributes being utilized by the adapter microcode. Context switching is used when the adapter microcode is to receive an instruction from a graphics application that utilizes different attributes than the adapted microcode is currently using. The context switch is typically initiated by the device driver which recognizes the attribute changes.

Blocks 300–340 are software code layers that are typically independent of the type of graphics adapter being utilized. Blocks 350–380 are software code layers that are typically dependent upon the type of graphics adapter being utilized. For example, if a different graphics adapter were to be used by the graphics application software, then a new GAI, graphics kernel and adapter microcode would be needed. In addition, blocks 300–370 typically reside on and are executed by the host computer. However, the adapter microcode 380 typically resides on and is executed by the graphics adapter. However, in some cases, the adapter microcode is loaded into the graphics adapter by the host computer during initialization of the graphics adapter.

In typical graphics systems, the user instructs the graphics application to construct an image from a two or three dimensional model. The user first selects the location and type of light sources. The user then instructs the application software to build the desired model from a set of predefined or user defined objects. Each object may include one or more coplanar drawing primitives describing the object. For example, a set of drawing primitives such as many triangles may be used to define the surface of an object. The user then provides a perspective in a window to view the model, thereby defining the desired image. The application software then starts the rendering of the image from the model by sending the drawing primitives describing the objects to the adapter microcode through the API, the GAI, and then the device driver unless DMA is used. The adapter microcode then renders the image on the graphics display by clipping (i.e. not using) those drawing primitives not visible in the window and the adapter microcode breaks each remaining drawing primitive into visible pixels from the perspective given by the user. The pixels are then loaded into the frame buffer, often with the use of a depth buffer in the case of a three dimensional model. This step is very computationally intensive due to the number of drawing primitives, variables, and pixels involved. The resulting image stored in the frame buffer and displayed on the graphics display typically does not carry the original information such as which drawing primitive or object the pixel was derived from. As a result, the image may need to be rerendered in part or in whole if the window, the user perspective, the model, the lighting, etc. are modified.

In the preferred embodiment, the dragging technique could be utilized in many locations such as the adapter microcode which is close to the adapter frame buffer. This approach would also be relatively quick and fairly easy to implement. In addition, the dragging technique could be applied in the graphics application software wherein the rendered image is also stored in system memory either prior to the image being rendered or subsequently by the graphics adapter passing the data back up to the graphics application software. This approach would be much slower but would allow for utilization of this technique on preexisting graphics adapters. The dragging technique could also be implemented in hardware in the graphics adapter processor. This approach is extremely quick but may necessitate specialized hardware. This would allow for rapid clipping of primitives to be displayed by the graphics adapter. As would be obvious to one of ordinary skill in the art, the present technique would be applied in many other locations within the host computer or graphics adapter.

Figure 3:
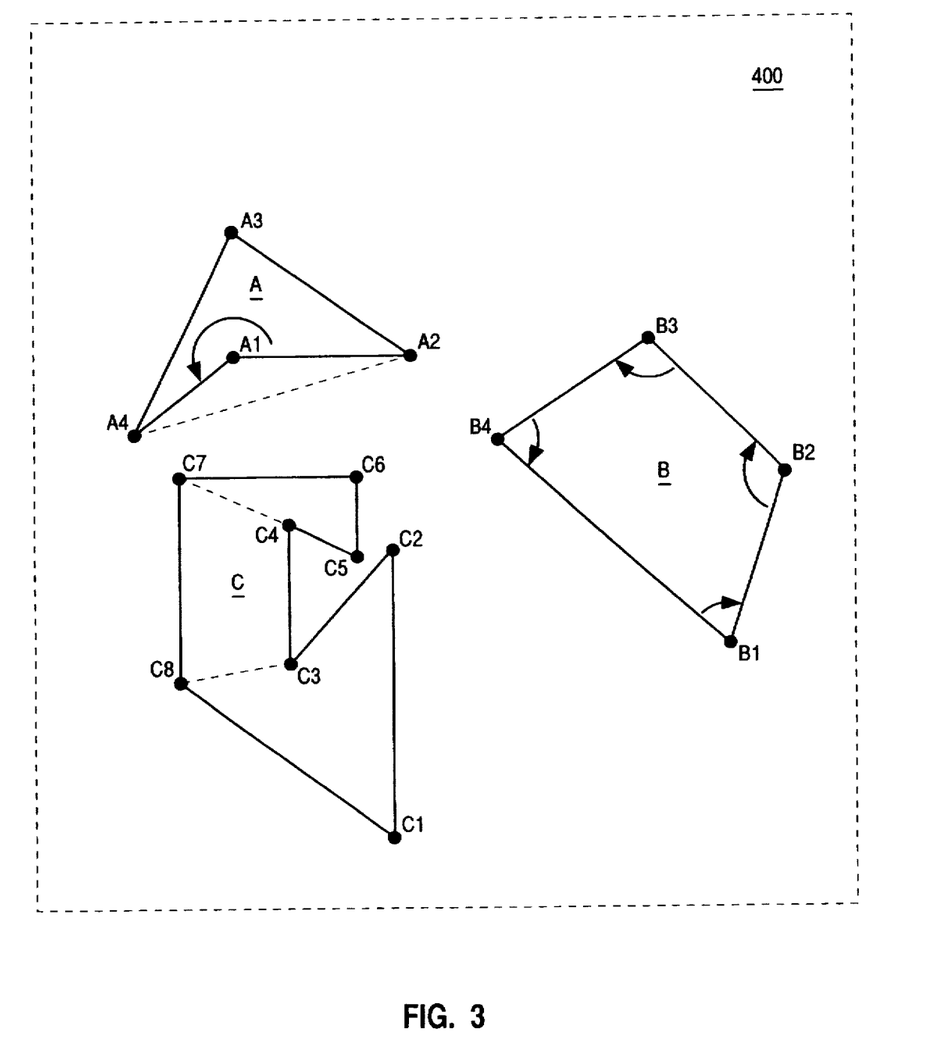
FIG. 3 illustrates several polygons including convex and concave polygons being displayed.

Most graphics objects can be described as polygons with a series of vertices. The polygon can be convex or concave. FIG. 3 illustrates several polygons including convex and concave polygons on a display 400. Polygons A and C are concave polygons while polygon B is a convex polygon. Each of the polygons is defined by a series of vertices which are interconnected by edges. A polygon is concave if there exists a vertex, such as vertex A1, that can be covered by the polygon when that vertex is removed from the polygon. For example, if vertex A1 was removed from polygon A then the new line running from vertices A2 to A4 would place previous vertex A1 on the interior of the polygon. A polygon may also be defined to be concave if the interior angle of the edges for any vertices is greater than 180 degrees. For example, in polygon B which is convex, all the interior angles at vertices are less than 180 degrees. However, the interior angle will at vertex A1 of polygon A is greater than 180 degrees.

Any concave polygon can be divided into a set of convex polygons by connecting each concave point to another vertex of the polygon such that each of the polygon parts is convex. With reference to polygon C of FIG. 3, the polygon can be divided into three convex polygons by dividing the polygon from vertex C4 to vertex C7 and from vertex C3 to vertex C8. In alternative approach to converting concave polygons to convex polygons is to divide each concave polygons into a series of triangles. With reference to polygon C of FIG. 3, the polygon C could also be divided from vertex C4 to vertex C6 and from vertex C3 to vertex C1 and from vertex C3 to vertex C7. In addition, all polygons could be broken into a set of triangles without determining whether the polygon is concave or convex. This would insure that all concave polygons are divided into a set of convex polygons.

In the preferred embodiment, when an object is dragged over another object, the dragged object can either dragged on top of the stationary object, below the stationary object, or some combination of above and below the stationary object called an interlock.

Figure 4A:
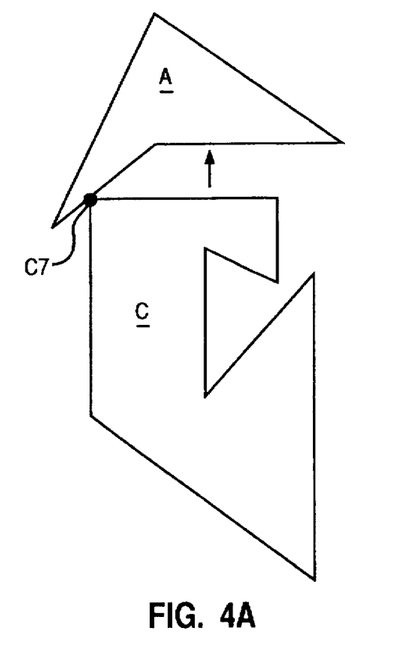
FIGS. 4A–4D illustrate dragging object C of FIG. 3 across object A of FIG. 3.
Figure 4B:
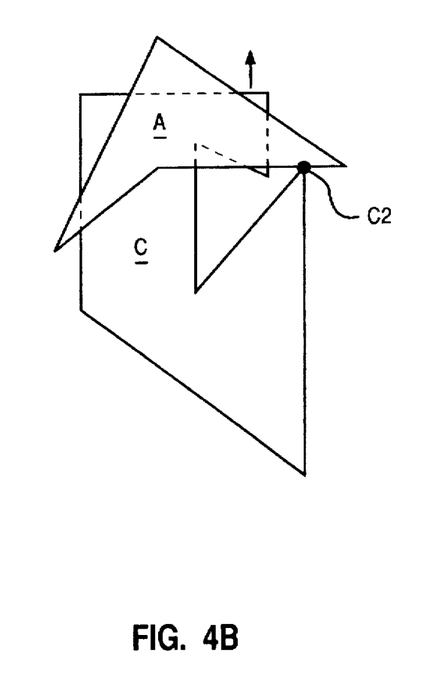
Figure 4C:
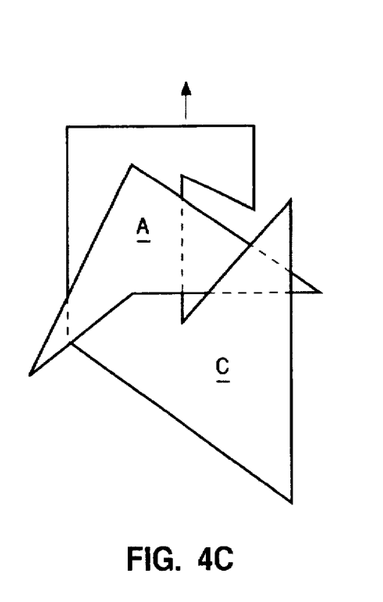
Figure 4D:
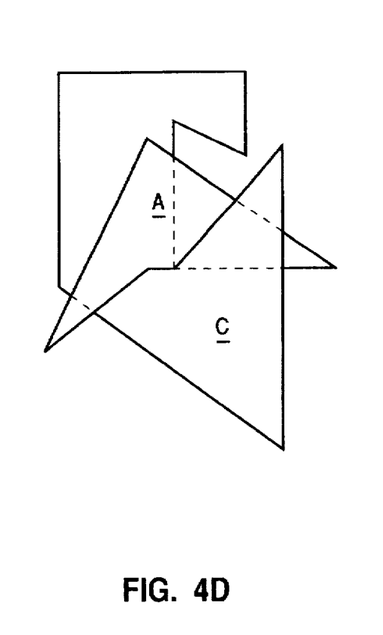

FIGS. 4A–4D illustrate dragging object C of FIG. 3 across object A of FIG. 3. FIG. 4A illustrates object C colliding with object A at vertex C7. At this point, in the preferred embodiment of the invention, the user designates whether object C would be dragged under or over object A. In the present example, the user selects object C to be dragged under object A for this collision. FIG. 4B illustrates object C being dragged under object A until a second point, vertex C2, collides with object A. At this point, according to the preferred embodiment of the invention, the user selects whether this part of object C will be dragged under or over object A. In the present example, the user selects that this part of object C will pass over object A. FIG. 4C illustrates objects A and C where a portion of object A overlays a portion of object C and another portion of object C overlays a portion of object A. FIG. 4D illustrates an interlock condition wherein object C can no longer be dragged upward. That is, given that one portion of object C overlays a portion of object A and another portion of object C underlays another portion of object A, any further dragging upward of object C will either require that object A or object C be sliced. In the preferred embodiment of the invention, object C will be prevented from being dragged upward to maintain the integrity of each object.

FIGS. 5A–5G are flowcharts illustrating dragging a graphical object according to a preferred embodiment of the invention. This flowchart assumes the user is using a mouse with buttons to pick and drag a desired graphical object. However, other alternative methods of picking and dragging objects would be apparent to those of ordinary skill in the art. In addition, graphical objects may be composed of several parts to handle the case where those graphical objects are concave and have been split into several convex parts, or the case where those graphical objects are a collection of several graphical objects grouped together to be dragged as a single graphical object. In the present example, each part of each object has an ABOVE_LIST to indicate which parts of other objects are above that part and a BELOW_LIST to indicate which parts of other objects are below that part.

Figure 5A:
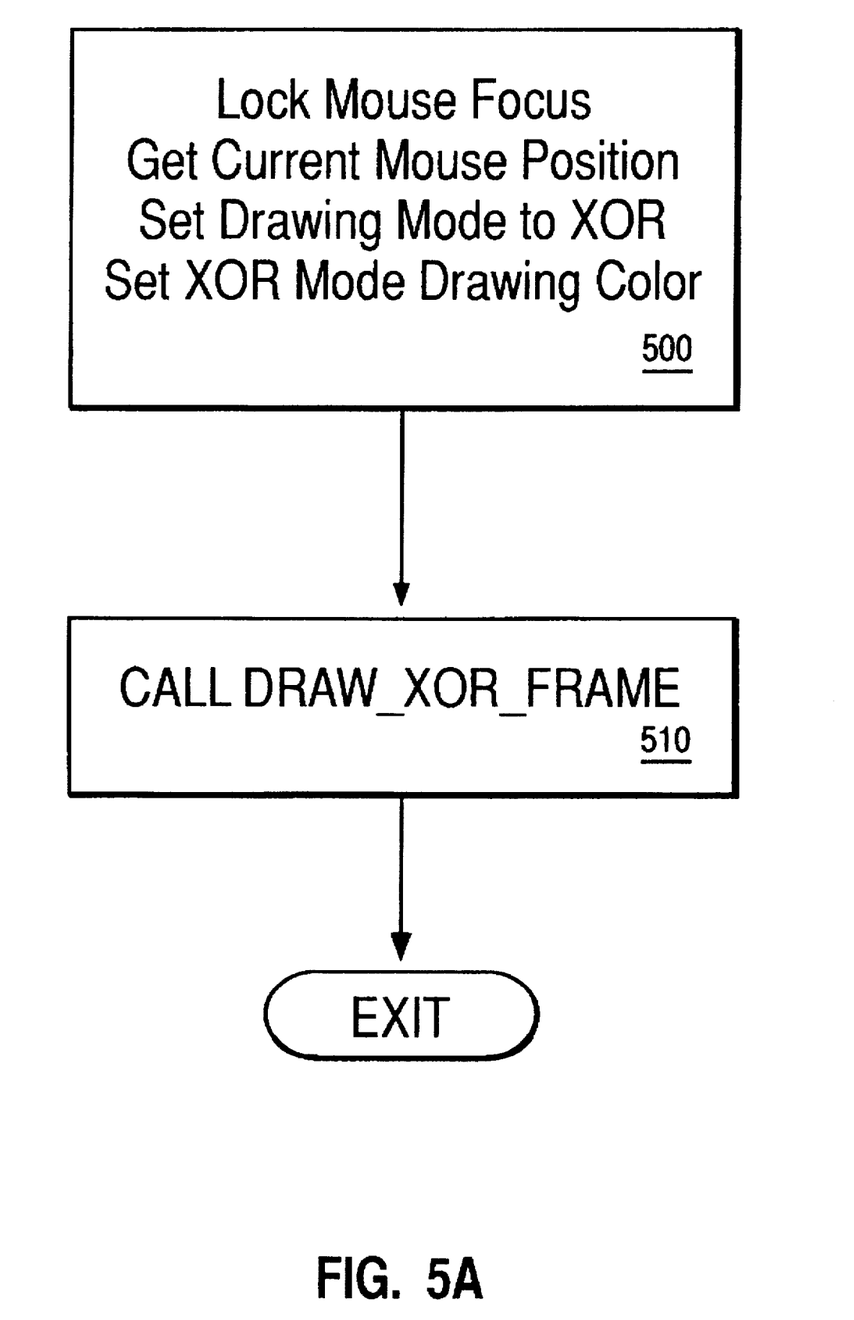
FIGS. 5A–5G are flowcharts illustrating dragging a graphical object according to a preferred embodiment of the invention.

FIG. 5A illustrates the initialization steps taken when an object is first picked in anticipation of dragging the object by the user and is preferably called when a mouse button is pressed. In step 500, the mouse focus is locked to maintain a pick on the object pointed to, the current position of the mouse is obtained to compute the position of the object outline as the object is dragged, the drawing mode is set to XOR (which will cause the object to be erased the second it is drawn in the same location) and the color is also set for showing a colored outline of the object as it is dragged. In step 510, a routine DRAW_XOR_FRAME is called to draw the XOR frame of the object prior to the object being dragged. The DRAW_XOR_FRAME routine is described in greater detail below. Pseudocode for FIG. 5A is provided in TABLE 1.

TABLE 1

Initialize Dragging Operation

METHOD MOUSE_BUTTON_PRESSED:
  LOCK MOUSE FOCUS;
  GET THE CURRENT MOUSE POSITION;
  SET THE DRAWING MODE TO XOR MODE;
  SET THE XOR MODE DRAWING COLOR;
  CALL (DRAW_XOR_FRAME) TO DRAW THE
    INITIAL XOR FRAME BEFORE DRAGGING;
ENDMETHOD.

Figure 5B:
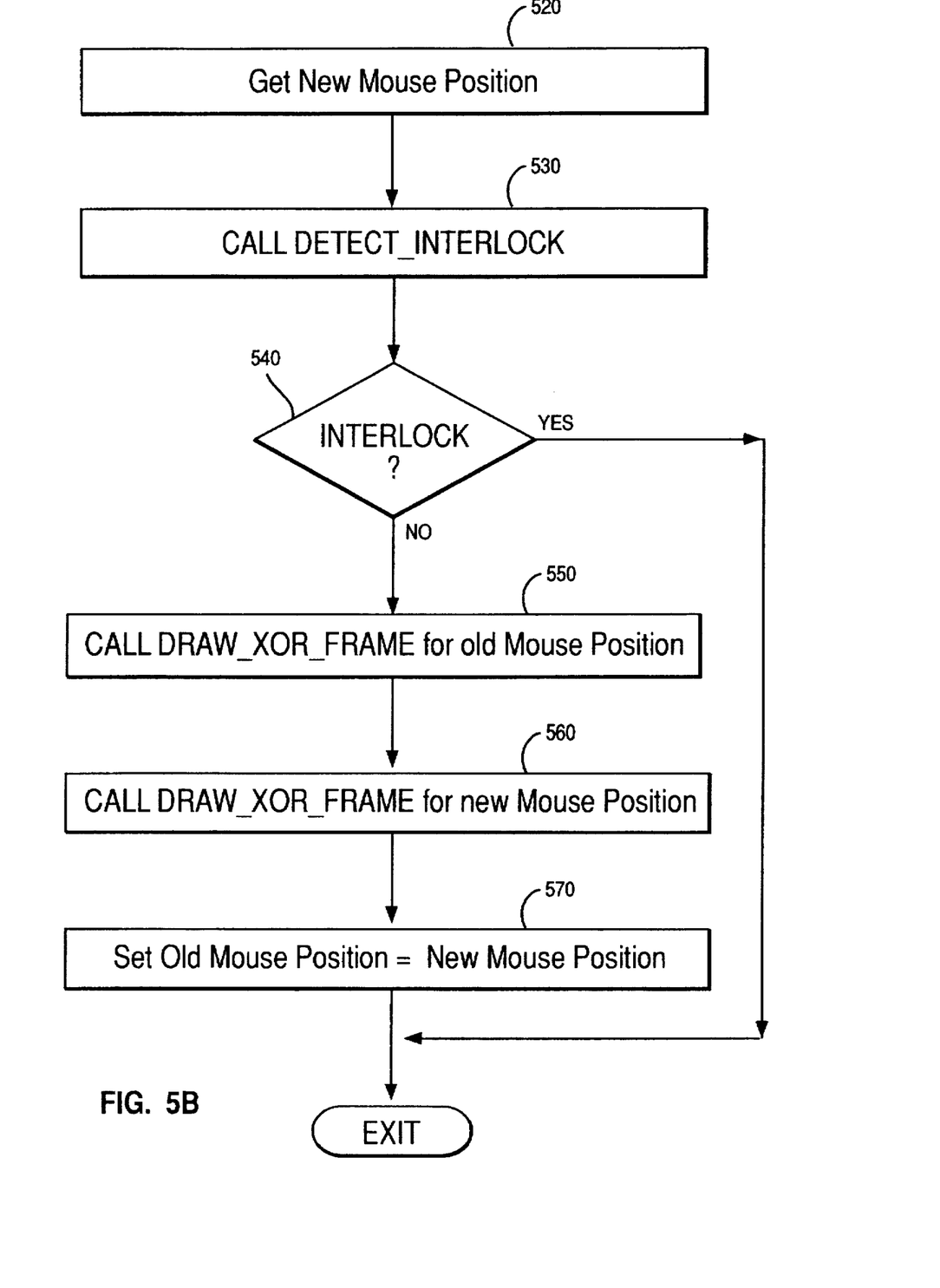

FIG. 5B illustrates the steps taken when the user starts to drag the object by moving the mouse while the mouse button is pressed. In a first step 520, the new position of the mouse is obtained. In a second step 530, routine DETECT_INTERSECT is called to determine whether the movement of the object has caused it to intersect or interlock with another object. This condition is tested in step 540. If an interlock condition has occurred, then the user may not drag the object any further and the drag routine is exited. In an alternative embodiment, the interlocked object may be grouped with the dragged object such that both objects are dragged together. If an interlock condition has not occurred, then processing continues to step 550. In steps 550 and 560, the XOR frame of the object is erased from the old position and then redrawn in the new position. In step 570, the old mouse position is set equal to the new mouse position. Pseudocode for FIG. 5B is provided in TABLE 2.

TABLE 2

Drag the Graphical Object

METHOD MOUSE_MOVED:
  GET THE NEW MOUSE POSITION;
  CALL (DETECT_INTERSECT);
  IF (INTERLOCK = FALSE) THEN:
    CALL (DRAW_XOR_FRAME) TO ERASE THE OLD
      XOR FRAME AT THE OLD MOUSE POSITION;
    CALL (DRAW_XOR_FRAME) TO DRAW THE NEW
      XOR FRAME AT THE NEW MOUSE POSITION;
    SET OLD MOUSE POSITION = NEW MOUSE
    POSITION;
  ENDIF;
ENDMETHOD.

Figure 5C:
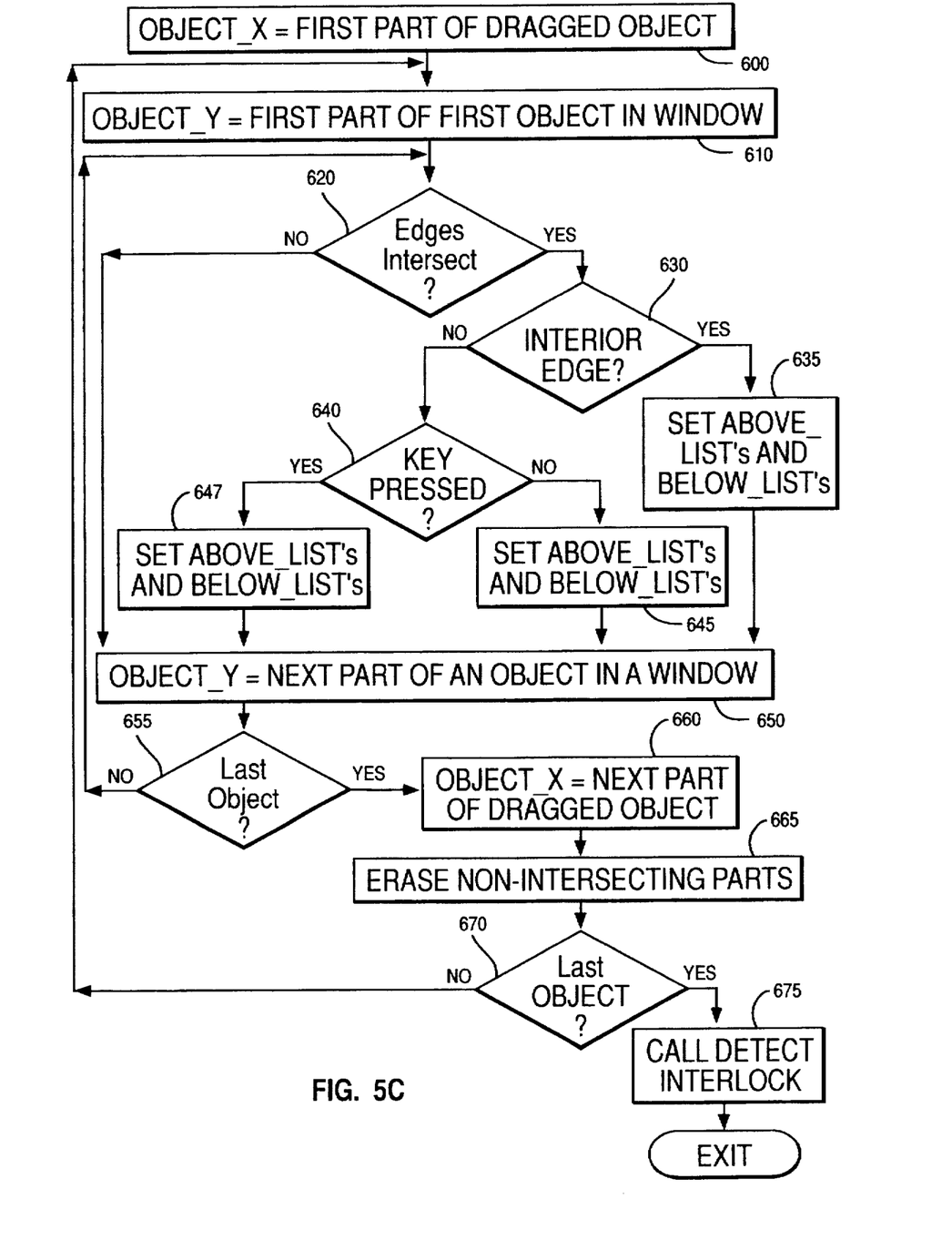

FIG. 5C illustrates the steps taken to determine whether the dragged object or a part of the dragged object has intersected a new object or part of an object. In a first step 600, OBJECT_X is set to the first part of the dragged object (for the cases where the dragged object is a concave object split into multiple convex objects). In step 610, OBJECT_Y is set to the first part of the first object in the window. In step 620, it is determined whether the two objects intersect for the first time. This can be determined by determining whether any of the edges of the objects intersect and then checking the ABOVE_LIST and BELOW_LIST of each object to see if a prior intersection has occurred. If step 620 is false, then processing continues to step 650 described below. If step 620 is true, then in step 630 it is determined whether the edges of intersection are an interior edge of either OBJECT_X or OBJECT_Y. If yes, then in step 635 the ABOVE_LIST and BELOW_LIST of each object is set to correspond to the ABOVE_LIST or BELOW_LIST of a corresponding part sharing the interior edge. That is, if OBJECT_X is intersecting OBJECT_Y for the first time at an interior edge of OBJECT_Y, then OBJECT_X must have previously intersected the part that shares the interior edge with OBJECT_Y. IF OBJECT_X is listed as below the other part that shares the interior edge, then OBJECT_X should also be below OBJECT_Y. Once step 635 is completed, processing continues to step 650 described below. If step 630 is false, then in step 640 it is determined whether the user is pressing the ALT key to indicate that OBJECT_X (the dragged object) should pass under OBJECT_Y. Of course, alternative embodiments could use other methods to indicate whether the dragged object should pass under or over other objects. If step 640 is false, then in step 645, OBJECT_X is listed in the ABOVE_LIST of OBJECT_Y and OBJECT_Y is listed in the BELOW_LIST of OBJECT_X. If step 640 is true, then in step 647, OBJECT_X is listed in the BELOW_LIST of OBJECT_Y and OBJECT_Y is listed in the ABOVE_LIST of OBJECT_X. In either case, processing continues to step 650. In 650, OBJECT_Y is set to the next part of an object in the window. In step 655, it is determined whether the last part of an object in the window has been processed. If not, then processing returns to step 620. If so, then in step 660, OBJECT_X is set to the next part of the dragged object. In step 665, all the entries of the previous OBJECT_X ABOVE_LIST and BELOW_LIST are checked to see whether all the other parts listed still intersect. This could be easily checked by flagging every entry in the lists during the above described steps 620–650. If non-intersecting entries exist, then those entries should be erased in all lists according to the preferred embodiment. This will allow the user to initially specify that a dragged object is over a second object, withdraw the dragged object from intersecting the second object so that the entries in the lists of both objects are erased, then allowing the user to drag the dragged object under the second object. In step 670, it is determined whether all the parts of OBJECT_X have been processed. If not, then processing returns to step 610. If so, the routine DETECT_INTERLOCK is called. The routine DETECT_INTERLOCK routine is described in detail below. Pseudocode for FIG. 5C is provided in TABLE 3.

TABLE 3

Detect Intersect Condition

METHOD DETECT_INTERSECT:
  SET OBJECT_X = FIRST PART OF THE DRAGGED
  OBJECT;
  REPEAT_START (FOR ALL PARTS OF THE DRAGGED
  OBJECT):
    SET OBJECT_Y = FIRST PART OF FIRST OBJECT IN TABLE 3-continued Detect Intersect Condition     THE WINDOW
    REPEAT_START (FOR ALL PARTS OF THE
    WINDOW OBJECTS):
      IF (ANY EDGE OF OBJECT_X INTERSECTS ANY
      EDGE OF
        OBJECT_Y FOR THE FIRST TIME) THEN:
      IF (THE INTERSECTING EDGE IS AN INTERIOR
      EDGE
        OF EITHER OBJECT_X OR OBJECT_Y)
        THEN:
      SET ABOVE_LIST AND BELOW_LIST OF
      OBJECT_X
        AND OBJECT_Y TO BE EQUAL TO THE
        PART OF OBJECT_X OR OBJECT_Y
        THAT SHARES THE COMMON INTERIOR
        EDGE;
      ELSE;
        IF (ALT KEY IS PRESSED) THEN:
        ADD OBJECT_Y TO THE BELOW_LIST
        OF OBJECT_X;
        ADD OBJECT_X TO THE ABOVE_LIST
        OF OBJECT_Y;
        ELSE:
        ADD OBJECT_Y TO THE ABOVE_LIST
        OF OBJECT_X;
        ADD OBJECT_X TO THE BELOW_LIST
        OF OBJECT_Y;
      ENDIF;
      ENDIF;
    ENDIF;
    SET OBJECT_Y = NEXT PART OF THE NEXT
    OBJECT IN
      THE WINDOW;
    REPEAT_UNTIL ALL THE PARTS OF ALL THE
    OBJECTS IN
      THE WINDOW HAVE BEEN PROCESSED;
    ERASE ALL ENTRIES IN DRAGGED OBJECT
    ABOVE_LIST AND
      BELOW_LIST AND CORRESPONDING ENTRIES
      IN WINDOW OBJECTS THAT NO LONGER
      INTERSECT EACH OTHER;
    SET OBJECT_X = NEXT PART OF THE DRAGGED
    OBJECT;
    REPEAT_UNTIL ALL THE PARTS OF THE
    DRAGGED OBJECT
      HAVE BEEN PROCESSED;
  CALL (DETECT_INTERLOCK)
ENDMETHOD.

Figure 5D:
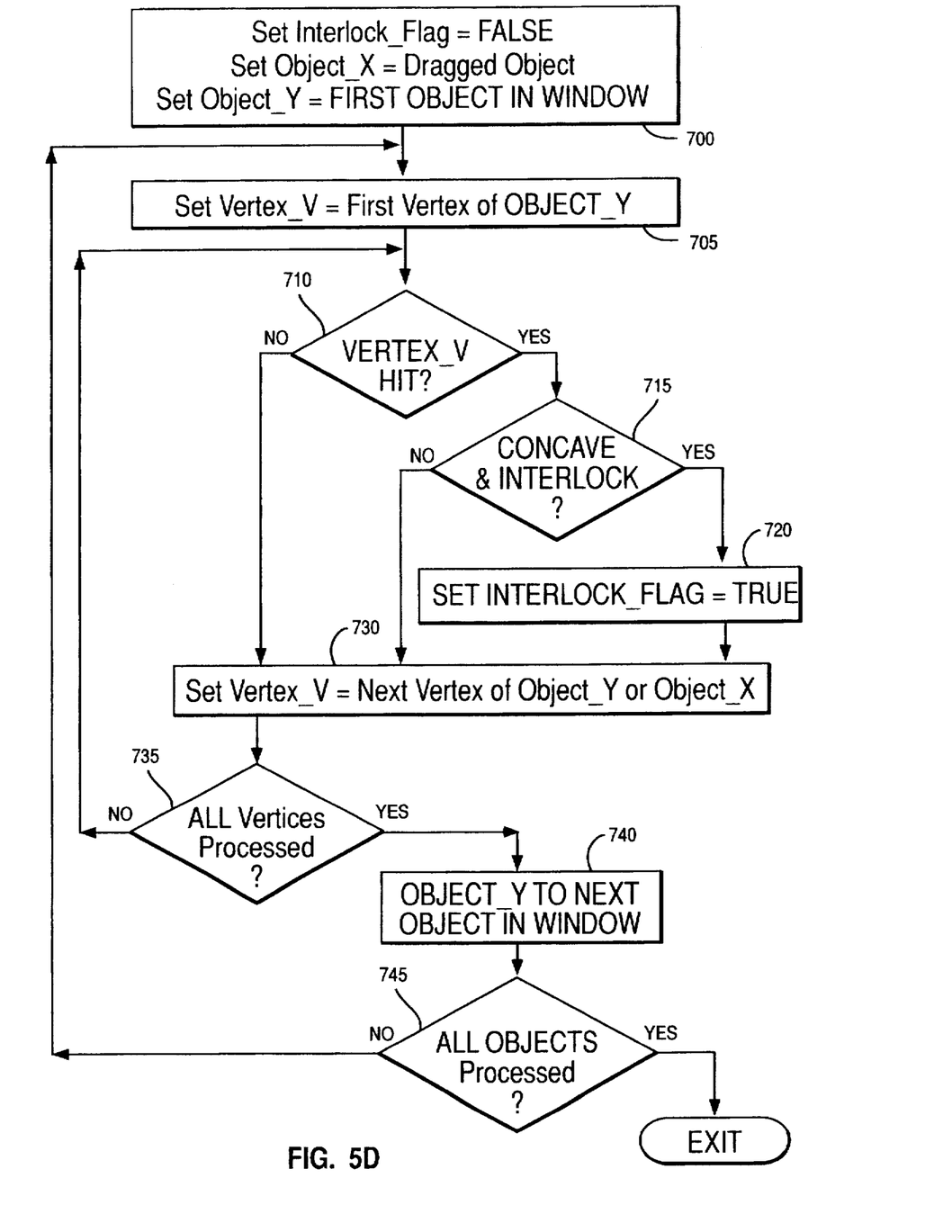

FIG. 5D illustrates the steps taken to determine whether an interlock condition exists. In a first step 700, an INTERLOCK_FLAG is set to false, OBJECT_X is set as the dragged object, and OBJECT_Y is set as the first object in the window. In step 705, VERTEX_V is set as the first vertex of OBJECT_Y. In step 710, it is determined whether OBJECT_X has encountered VERTEX_V of OBJECT_Y for the first time or whether OBJECT_Y has encountered VERTEX_V of OBJECT_X for the first time (all vertices of both OBJECT_Y and OBJECT_X are checked as VERTEX_V). If not, then processing continues to step 730 described below. If step 710 is true, then in step 715 it is determined whether VERTEX_V is in a concave portion of the object (OBJECT_Y or OBJECT_X) and whether an interlock condition occurs. An interlock condition occurs given VERTEX_V is a vertex of OBJECT_Y when OBJECT_X is above one part of OBJECT_Y and OBJECT_X is also below a second part of OBJECT_Y and both parts of OBJECT_Y contain VERTEX_V. An interlock condition occurs given VERTEX_V is a vertex of OBJECT_X when OBJECT_Y is above one part of OBJECT_X and OBJECT_Y is also below a second part of OBJECT_X and both parts of OBJECT_X contain VER- TEX_V. If step 715 is false, then an interlock condition has not occurred and processing continues to step 730 described below. If step 715 is true, then an interlock condition has occurred and processing continues to step 720. In step 720, the INTERLOCK_FLAG is set to TRUE and processing continues to step 730. In step 730, VERTEX_V is set to the next vertex of OBJECT_Y or OBJECT_X (once all the vertices of OBJECT_Y have been processed). In step 735, it is determined whether all the vertices of OBJECT_Y and OBJECT_X have been processed. If not, then processing returns to step 710. If so, then in step 740, OBJECT_Y is set to the next object in the window. In step 745, it is determined whether all the objects in the window have been processed. If not, then processing returns to step 705. If so, then processing stops for this routine. Pseudocode for FIG. 5D is provided in TABLE 4.

TABLE 4

Detect Interlock Condition

METHOD DETECT_INTERLOCK:
  SET INTERLOCK_FLAG = FALSE;
  SET OBJECT_X = THE DRAGGED OBJECT;
  SET OBJECT_Y = THE FIRST OBJECT IN
  THE WINDOW;
  REPEAT_START (FOR ALL OBJECTS):
    SET VERTEX_V = THE FIRST VERTEX OF
    OBJECT_Y;
    REPEAT_START (FOR ALL OBJECT_Y &
    X VERTICES):
      IF (OBJECT_X ENCOUNTERS VERTEX_V OF
      OBJECT_Y FOR
        THE FIRST TIME OR OBJECT_Y
        ENCOUNTERS
        VERTEX_V OF OBJECT_X FOR
        THE FIRST TIME)
        THEN:
        IF (VERTEX_V IS IN A CONCAVE AREA AND
        PART OF
          OBJECT_Y IS BELOW OBJECT_X
          AND IF ANOTHER
          PART OF OBJECT_Y IS ABOVE OBJECT_X
          AND BOTH
          PARTS OF OBJECT_Y OR OBJECT_X
          CONTAIN
          VERTEX_V) THEN:
          SET INTERLOCK_FLAG = TRUE;
        ENDIF;
      ENDIF;
      SET VERTEX_V = NEXT VERTEX OF
      OBJECT_Y OR
        OBJECT_X;
    REPEAT_UNTIL ALL THE VERTICES OF
    OBJECT_Y AND
      OBJECT_X HAVE BEEN PROCESSED;
    SET OBJECT_Y = NEXT OBJECT IN THE WINDOW;
  REPEAT_UNTIL ALL THE OBJECTS IN THE WINDOW
  HAVE BEEN
    PROCESSED;
ENDMETHOD.

Figure 5E:
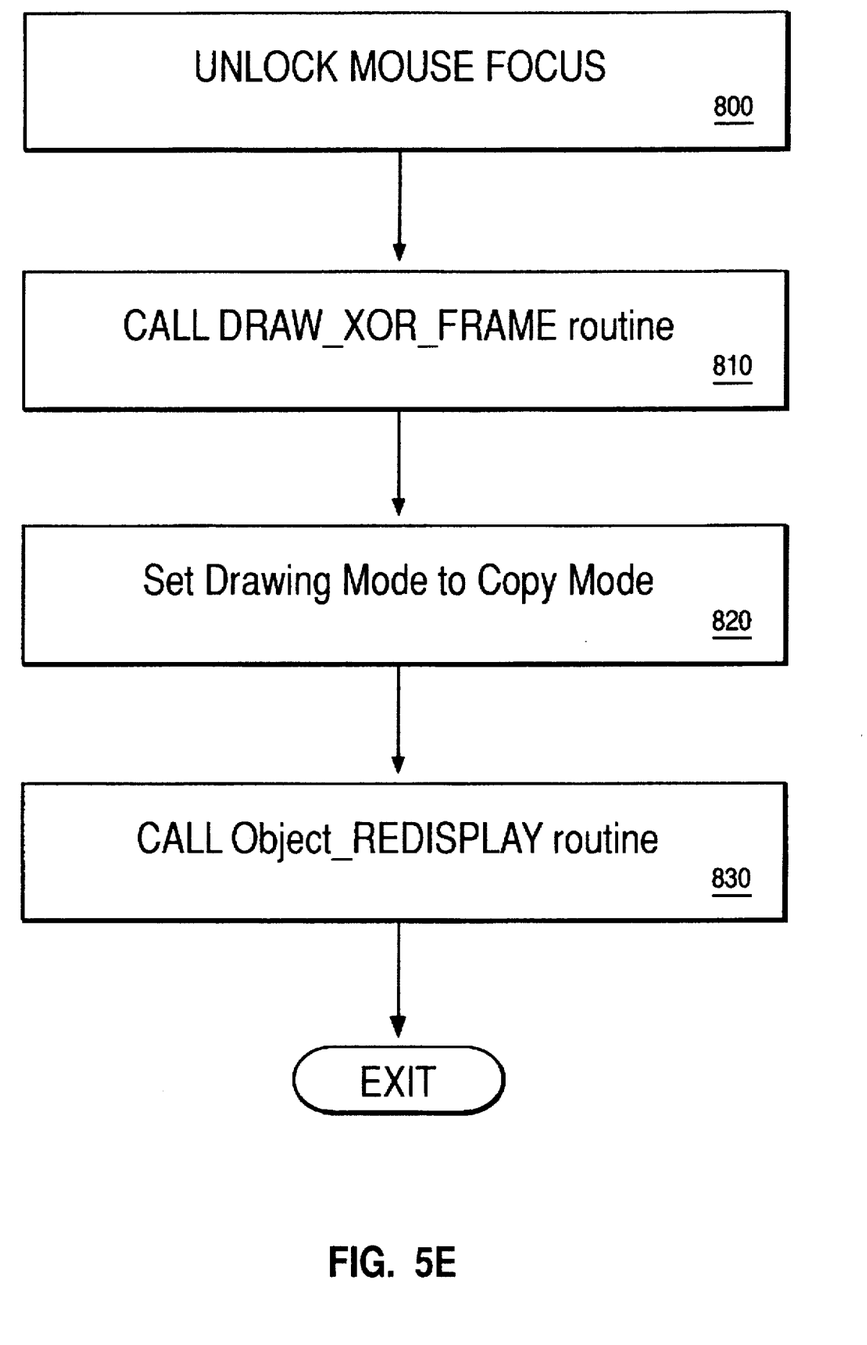

FIG. 5E illustrates the termination steps taken when the user completes dragging the graphical object and is called when the mouse button is released. In step 800, the mouse focus is unlocked thereby releasing the pick of the object. In step 810, the routine DRAW_XOR_FRAME is called to erase the last XOR frame of the object at the current mouse position. In step 620, the drawing mode is set back to copy mode from XOR mode. In step 630, routine OBJECT_REDISPLAY is called to redraw the object in full form at the final mouse position. The OBJECT_REDISPLAY routine is described in greater detail below in reference to 5G. Pseudocode for FIG. 5E is provided in TABLE 5.

TABLE 5

TERMINATE DRAGGING OPERATION

METHOD MOUSE_BUTTON_RELEASED:
  UNLOCK THE MOUSE FOCUS;
  CALL (DRAW_XOR_FRAME) TO ERASE THE
  LAST XOR FRAME AT
    THE CURRENT MOUSE POSITION;
  SET THE DRAWING MODE TO COPY MODE;
  CALL (OBJECT_REDISPLAY) TO REDISPLAY
  THE DRAGGED
    OBJECT_X AT THE FINAL MOUSE POSITION;
ENDMETHOD.

Figure 5F:
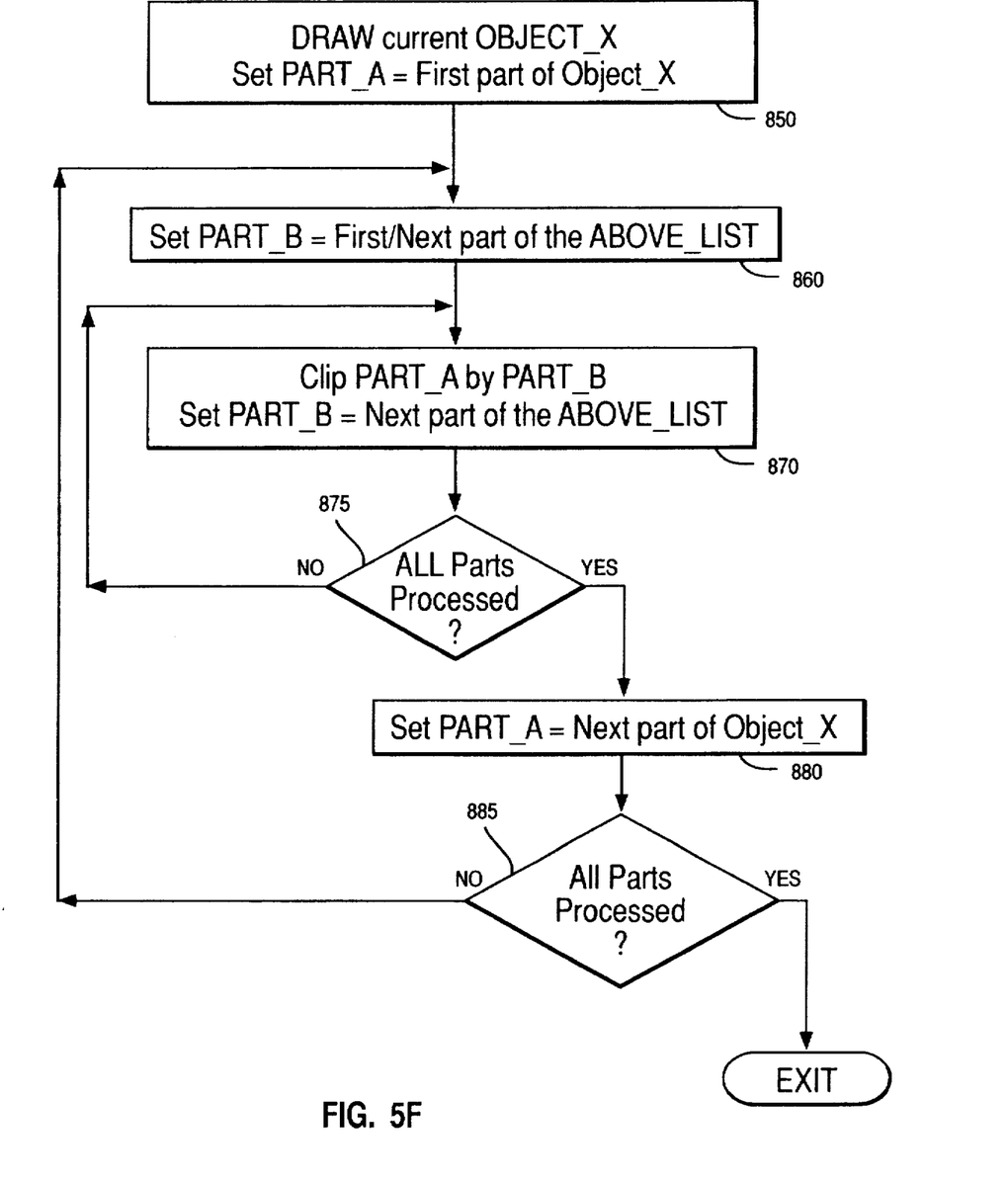
Figure 5G:
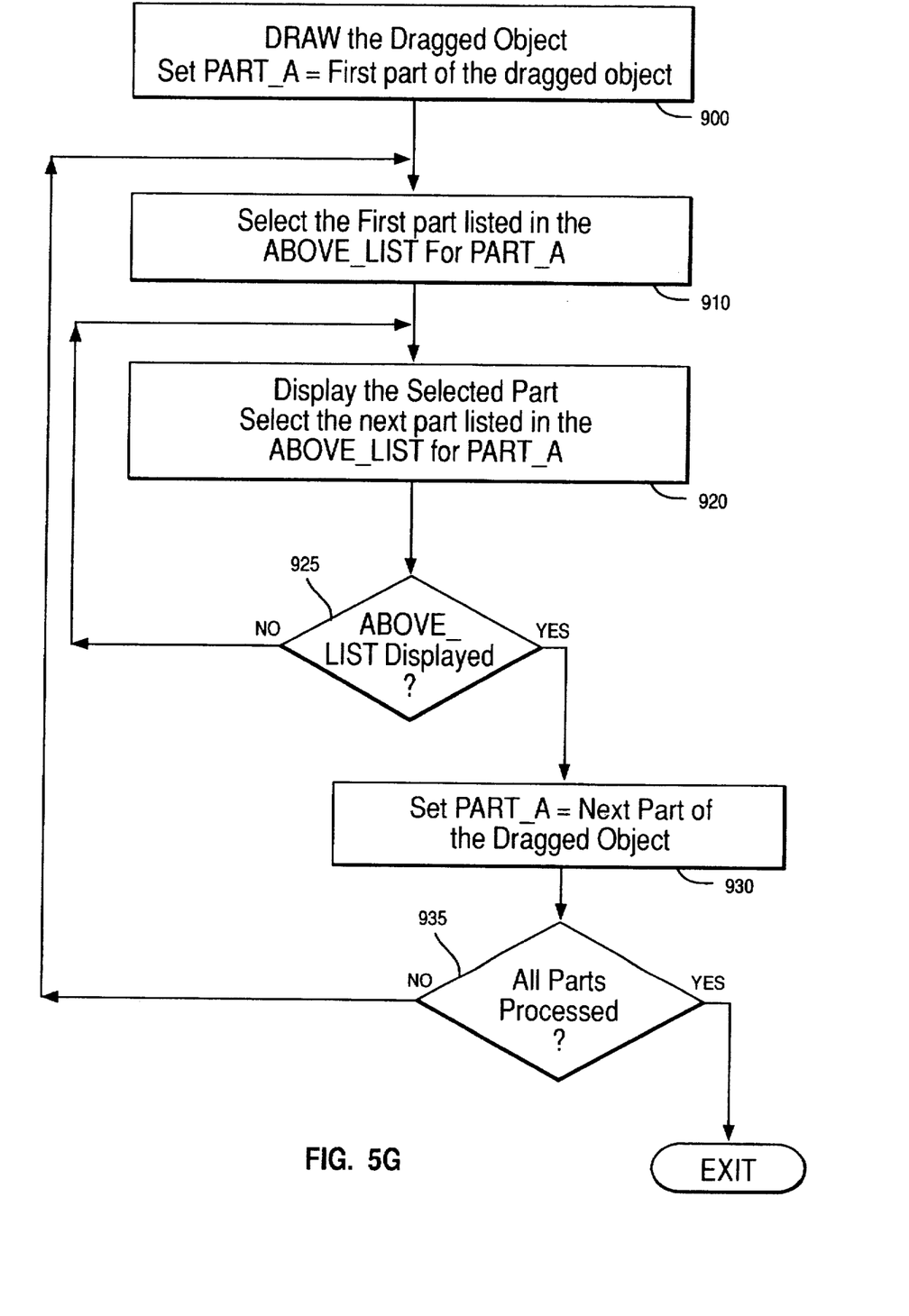

FIG. 5F illustrates the steps taken to draw the dragged object and is called by the routines described above. In step 850, PART_A is set to the first part of OBJECT_X (this is to handle the case where OBJECT_X is concave and has been split into several convex parts or OBJECT_X is a collection of graphical objects). In step 860, OBJECT_Y is set to the first object of the ABOVE_LIST. In step 870, PART_A is clipped by OBJECT_Y and OBJECT_Y is set to the next part of the ABOVE_LIST. In step 875, it is determined whether all the parts of the top list have been processed. If not, then processing returns to step 870, else processing continues to step 880. In step 880, PART_A is set to the next part of OBJECT_X. In step 885, it is determined whether all the parts of OBJECT_X have been processed. If not, then processing returns to step 860, else processing stops. Pseudocode for FIG. 5F is provided in TABLE 6.

TABLE 6

Draw Object XOR Frame

METHOD DRAW_XOR_FRAME:
  SET PART_A = THE FIRST PART OF THE DRAGGED
  OBJECT_X;
  REPEAT_START:
    SET OBJECT_Y = THE FIRST PART OF THE
    ABOVE_LIST;
    REPEAT_START:
      CLIP PART_A BY OBJECT_Y;
      SET OBJECT_Y = THE NEXT PART OF THE
      ABOVE_LIST;
    REPEAT_UNTIL ALL THE PARTS OF THE
    ABOVE_LIST HAVE
      BEEN PROCESSED;
    SET PART_A = THE NEXT PART OF THE
    DRAGGED OBJECT_X;
  REPEAT_UNTIL ALL THE PARTS OF THE
  DRAGGED OBJECT_X
    HAVE BEEN PROCESSED;
ENDMETHOD.

FIG. 5G illustrates the steps taken to redisplay a dragged object in a window and is called by the routines described above. In step 900, the dragged object is drawn and PART_A is set as the first part of the dragged object. In step 910, the first entry of the ABOVE_LIST of PART_A is retrieved. In step 920, the object that contains the selected part listed in the ABOVE_LIST of PART_A is displayed. In addition, the next entry of the ABOVE_LIST of PART_A is retrieved. In step 925, it is determined whether all the entries in the ABOVE_LIST of PART_A have been processed. If not, then processing returns to step 920. If so, then in step 930, PART_A is set to the next part of the dragged object. In step 935, it is determined whether all parts of the dragged have been processed. If not, then processing returns to step 910. If so, then processing ends. Pseudocode for FIG. 5G is provided in TABLE 7.

TABLE 7

REDISPLAY OBJECT

```
METHOD OBJECT_REDISPLAY:
  DRAW THE DRAGGED OBJECT;
  SET PART_A = THE FIRST PART OF THE
  DRAGGED OBJECT;
  REPEAT_START:
    START FROM THE FIRST PART OF THE
    ABOVE_LIST OF
        PART_A;
    REPEAT_START:
      DISPLAY THE OBJECT THAT CONTAINS THE
      PART IN THE
          ABOVE_LIST OF PART_A;
      MOVE TO THE NEXT PART OF THE
      ABOVE_LIST OF
          PART_A;
    REPEAT_UNTIL ALL THE PARTS OF THE
    ABOVE_LIST OF
        PART_A HAVE BEEN PROCESSED;
    SET PART_A = THE NEXT PART OF THE
    DRAGGED OBJECT;
  REPEAT_UNTIL ALL THE PARTS OF THE DRAGGED
  OBJECT HAVE
      BEEN PROCESSED;
ENDMETHOD.
```

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for moving graphical objects comprising:

a display for displaying a plurality of graphical objects according to a display priority;

means for moving, responsive to a user input, a first displayed graphical object; and means for modifying, responsive to a user input, a display priority of the moved graphical object as the graphical object is moved such that the moved graphical object is displayed under a first portion and above a second portion of a second displayed graphical object.

2. The apparatus of claim 1 further comprising means for computing whether the moved graphical object interlocks the second displayed graphical object.

3. The apparatus of claim 2 further comprising means for preventing said moved graphical object from being moved any further if the moved graphical object is computed to interlock the second displayed graphical object.

4. The apparatus of claim 2 further comprising means for grouping said second displayed graphical object with said moved graphical object so that both objects are moved together.

5. A data processing system comprising:

a display for displaying a plurality of graphical objects according to a display priority;

a memory for storing data;

a processor for processing said stored data, said processor including:

means for moving, responsive to a user input, a first displayed graphical object; and means for modifying, responsive to a user input, a display priority of the moved graphical object as the graphical object is moved such that the moved graphical object is displayed under a first portion and above a second portion of a second displayed graphical object.

6. The data processing system of claim 5 wherein said processor further includes means for computing whether the moved graphical object interlocks the second displayed graphical object.

7. The data processing system of claim 6 wherein said processor further includes means for preventing said moved graphical object from being moved any further if the moved graphical object is computed to interlock the second displayed graphical object.

8. The data processing system of claim 6 wherein said processor further includes means for grouping said second displayed graphical object with said moved graphical object so that both objects are moved together.

9. A method for moving graphical objects comprising:

displaying a plurality of graphical objects according to a display priority on a display;

moving, responsive to a user input, a first displayed graphical object; and modifying, responsive to a user input, a display priority of the moved graphical object as the graphical object is moved such that the moved graphical object is displayed under a first portion and above a second portion of a second displayed graphical object.

10. The method of claim 9 further comprising the step of computing whether the moved graphical object interlocks the second displayed graphical object.

11. The method of claim 10 further comprising the step of preventing said moved graphical object from being moved if the moved graphical object is computed to interlock the second displayed graphical object.

12. The method of claim 10 further comprising the step of grouping said second displayed graphical object with said moved graphical object so that both objects are moved together.

13. A computer program product for moving graphical objects comprising:

computer readable program code means for displaying a plurality of graphical objects according to a display priority on a display;

computer readable program code means for moving, responsive to a user input, a first displayed graphical object; and computer readable program code means for modifying, responsive to a user input, a display priority of the moved graphical object as the graphical object is moved such that the moved graphical object is displayed under a first portion and above a second portion of a second displayed graphical object.

14. The computer program product of claim 13 further comprising computer readable program code means for computing whether the moved graphical object interlocks the second displayed graphical object.

15. The computer program product of claim 14 further comprising computer readable program code means for preventing said moved graphical object from being moved if the moved graphical object is computed to interlock the second displayed graphical object.

16. The computer program product of claim 14 further comprising computer readable program code means for grouping said second displayed graphical object with said moved graphical object so that both objects are moved together.

\* \* \* \* \*